(12) United States Patent
Chang

(10) Patent No.: US 6,382,366 B1
(45) Date of Patent: May 7, 2002

(54) BRAKE DEVICE IN A SKATEBOARD CART

(76) Inventor: Yung-Tsun Chang, No. 517-1, Kuang-Fu Rd., Pa-Te, Taoyuan Hsien (TW)

( * ) Notice: Subject to any disclaimer, the term of this patent is extended or adjusted under 35 U.S.C. 154(b) by 0 days.

(21) Appl. No.: 09/780,408

(22) Filed: Feb. 12, 2001

(51) Int. Cl.[7] .......................... B62K 9/00; A63C 17/14; B62M 1/00; B60T 1/00
(52) U.S. Cl. ............................ 188/29; 188/19; 188/74; 188/216; 280/87.041
(58) Field of Search ............................. 188/29, 74, 19, 188/216; 280/87.041, 87.062, 87.021, 11.204–11.217, 11.221, 87.01, 87.05; D21/423; 180/219

(56) References Cited

U.S. PATENT DOCUMENTS

| | | | |
|---|---|---|---|
| 4,050,705 A | * | 9/1977 | Kries |
| 5,927,733 A | * | 7/1999 | Banda .................. 280/87.041 |
| 6,120,044 A | * | 9/2000 | Tsai ...................... 280/87.041 |
| 6,286,632 B1 | * | 9/2001 | Chai ............................ 188/29 |
| 6,296,082 B1 | * | 10/2001 | Tsai ............................. 188/19 |
| 6,298,952 B1 | * | 10/2001 | Tsai ............................. 188/29 |

* cited by examiner

Primary Examiner—Douglas C. Butler

(57) ABSTRACT

A brake device in a skateboard cart comprises a square fixed base, a brake cover, and two springs. The fixed base has an upright side and a projection ear with an engaging hole extending outward from an upper part of the upright side horizontally. Two circular grooves are provided at two lower corners of the upright side respectively and the fixed base is fixedly attached to a rear part of the skateboard cart. The brake cover has lower end is pivotally engaged to the engaging hole of the projection ear. These two springs are received in these two circular grooves respectively and urge against the lower end of the brake cover. The brake cover can be operated smoothly and conveniently to keep away the rear wheel of the skateboard cart by way of resilient forces of the two springs urging against the lower end of the brake cover in case of the brake cover being not pressed by a foot.

2 Claims, 3 Drawing Sheets

BRAKE DEVICE IN A SKATEBOARD CART

BACKGROUND OF THE INVENTION

1. Field of the Invention

The present invention relates to a brake device in a skateboard cart, and particularly to a brake device, which is assembled easily and operated conveniently, and has an excellent braking effect for a skateboard cart.

2. Description of Related Art

The leisure sport is getting to be emphasized due to our busy life style. A skateboard cart is a quite popular sport tool in recent years due to its simplicity in use and its effect for fun. Playing the skateboard cart is possible to acquire amusement of fast speed. Hence, a brake is usually mounted to the skateboard cart to be operated for lowering its speed or stopping it from moving. But the prior art brake device in a skateboard cart is sophisticate in structure and hard to assemble parts thereof together, and it is required a great pressing force to operate the brake device inconveniently. These disadvantages are disliked by and have bothered suppliers and users for a long time. Hence, it is a necessity that an improved brake device can be developed to overcome the preceding defects residing in the prior art.

SUMMARY OF THE INVENTION

The present invention is to provide a brake device in a skateboard cart, in which the brake device provides a square fixed base at an upright lateral side thereof having a horizontal projection ear at its upper central part with an engaging hole therein. A respective circular groove is arranged near two lower corners of the upright lateral side to extend inward from outside. The fixed base is mounted at the rear part of the pedal on the skateboard. A brake cover at an end thereof is provided with a fitting hole engaging with the engaging hole in the projection ear so that the brake cover is pivotally attached to the projection ear. In addition, two springs are received in the respective circular groove to press against the lowest end of the brake cover.

Accordingly, an object of the present invention is to provide a brake device, which is simple in structure, easy for assembling, and convenient for operation.

Another object of the present invention is to provide a brake device in a skateboard cart, with which a brake cover can keep away from a rear wheel in the skateboard cart in a normal situation automatically.

A further object of the present invention is to provide a brake device, with which a brake function can be performed by way of the brake cover being pressed down simply by a foot to contact the rear wheel.

BRIEF DESCRIPTION OF THE DRAWINGS

The major feature and the novelty of the present invention can be more fully understood by referring to the following description and accompanying drawings, in which.

DETAILED DESCRIPTION OF THE PREFERRED EMBODIMENT

Figure 1:
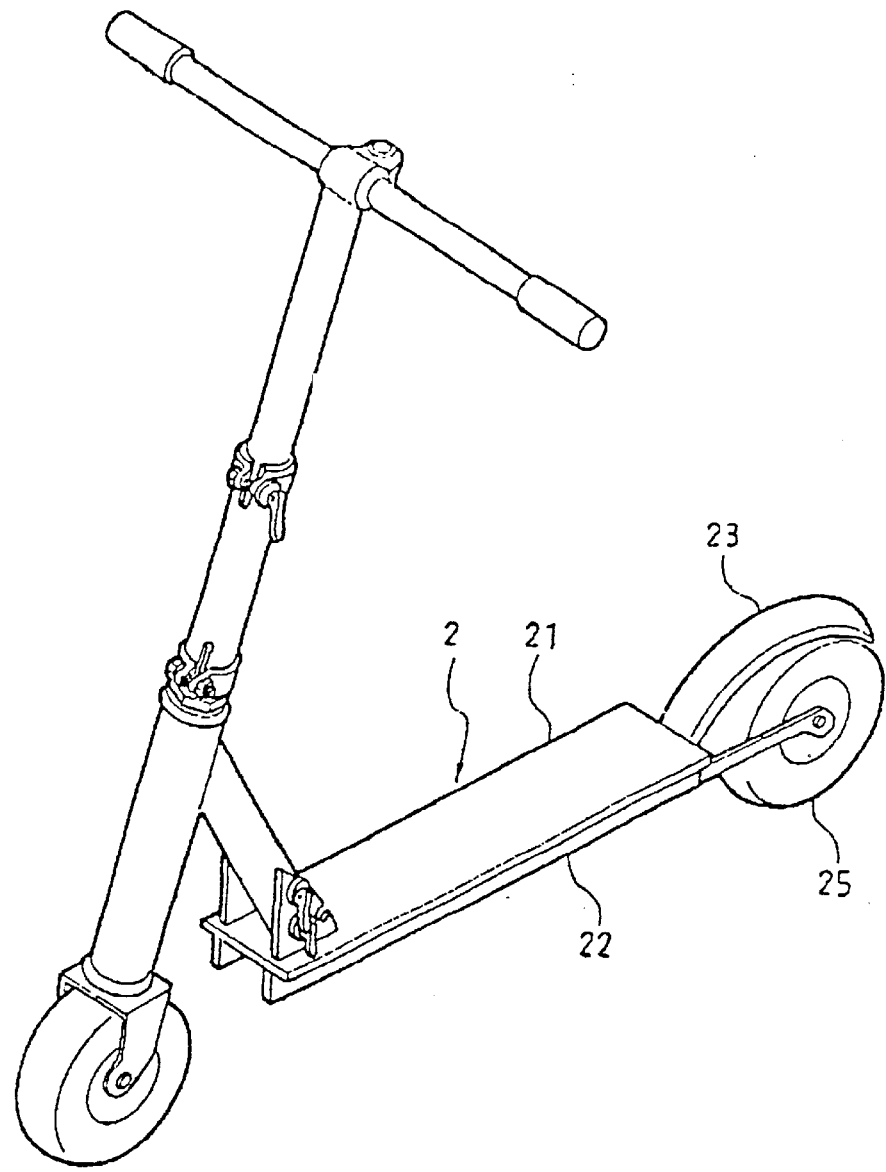
FIG. 1 is a perspective view of a skateboard cart with the brake device according to the present invention.
Figure 2:
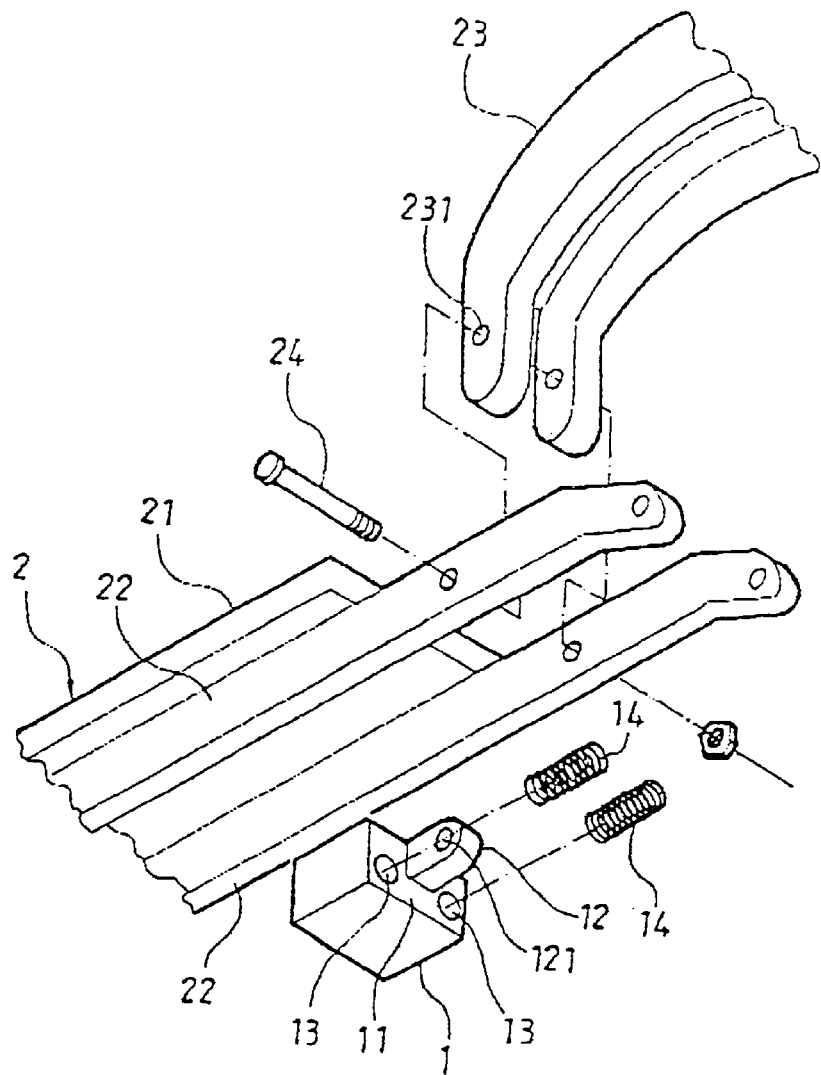
FIG. 2 is a disassembled fragmentary perspective view of the skateboard cart illustrating parts in the brake device according the present invention.
Figure 3:
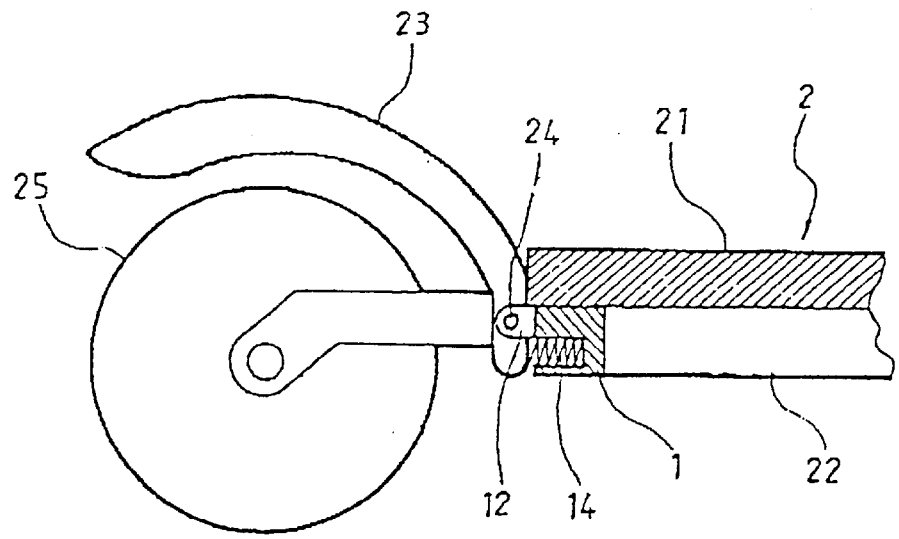
FIG. 3 is a sectional view of rear part of the skateboard cart illustrating the assembled brake device according to the present invention illustrating an earring.

Referring to FIGS. 1, 2, and 3, the brake device of the present invention in a skateboard cart provides a square fixed base 1. The fixed base 1 at an upright lateral side 11 thereof has a horizontally extending projection ear 12 at its upper central part with an engaging hole 121 therein. A respective circular groove 13 is arranged near two lower corners of the upright lateral side 11 to extend inward from outside. The fixed base 1 is mounted at the rear part of the pedal 21 on the skateboard cart 2 between two extending ribs 22 under the pedal 21. A brake cover 23 on the skateboard cart 2 at an end thereof is provided with a through hole 231. The through hole 231 is aligned with the engaging hole 121 in the projection ear 12 on the fixed base 1 so as to be fastened by a stud 24. Thus, the brake cover 23 can be pivotally attached to the projection ear 12. In addition, two springs 14 are received in the respective circular groove 13 to press against the lowest end of the brake cover 23.

The brake cover 23 at the lower end thereof engages with the projection ear 12 on the fixed base 1 as soon as the preceding components are assembled together. Thus, these two springs 14 urge against the lower end of the brake cover 23 such that the brake cover at the upper end thereof is in a state of moving upward. The user presses the brake cover downward with a foot to contact the rear wheel 25 of a skateboard cart and execute the function of braking, and the resilient forces of the springs 14 have the brake cover 23 move back to its original position. In this way, the operation of the brake may be smoothly performed easily and conveniently.

Figure 4:
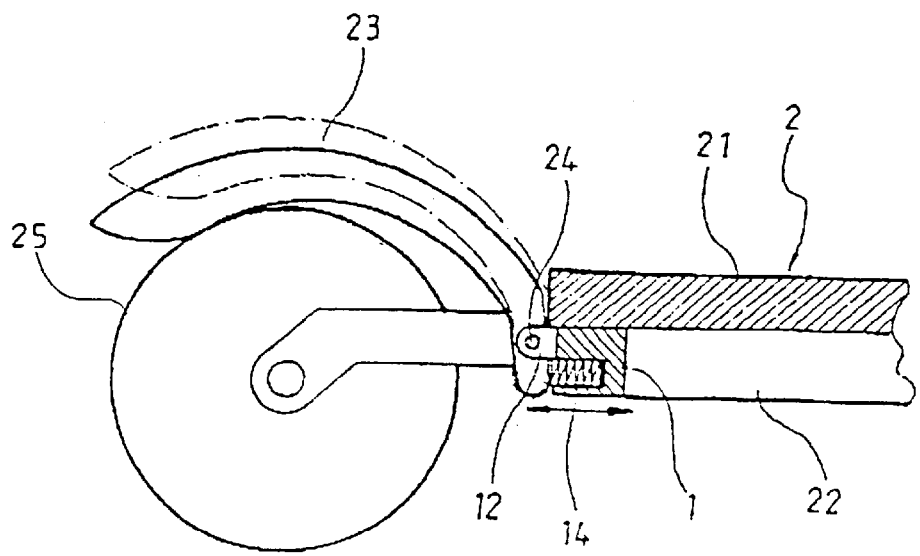
FIG. 4 is a sectional view similar to FIG. 3 illustrating the brake in operation.

Referring to FIG. 4, the operation of the brake cover 23 will be described in detail hereinafter. While the skateboard cart is in a normal situation, i.e., the skateboard keeps in moving, the stud 24, which pivotally fastens the brake cover 23 to the projection ear 12 on the fixed base 1, acts as a fulcrum for the brake cover 23. Hence, the upper end of the brake cover 23 can move upward away the rear wheel 25 because springs 14 urges the lower end of the brake cover 23. While the user presses the brake cover 23 by the foot, the brake cover 23 may move downward with respect to the stud 24 to contact with the rear wheel 25. Thus, a frictional braking can be performed and springs 24 are in a state of being compressed in circular grooves. Once the action of braking is complete and the foot is away the brake cover, springs 14 are release from being compressed and urge the lower end of the brake cover 23. Accordingly, the upper end of the brake cover 23 move away the rear wheel 25 to restore its original position for next braking movement so that the entire operation of the brake cover 23 is smooth and accurate.

It is appreciated that the present invention provides a novel and useful structure of brake device. A fixed base with a projection ear and springs to engage with a brake cover such that the operation of the brake cover can be performed smoothly and accurately. Therefore, the brake device in a skateboard cart according to the present invention overcomes the shortcomings of the prior art substantially.

While the invention has been described with reference to a preferred embodiment thereof, it is to be understood that modifications or variations may be easily made without departing from the spirit of this invention, which is defined by the appended claims.

What is claimed is:

1. A brake device in a skateboard cart, comprising:

a square fixed base with an upright side, a projection ear with an engaging hole extending outward from an upper part of the upright side, and two circular grooves being provided at two lower corners of the upright side respectively, and being fixedly attached to a rear part of the skateboard cart;

a brake cover with a lower end, the lower end thereof being pivotally engaged to the engaging hole of the projection ear;

two springs, being received in said two circular grooves respectively and urging against the lower end of the brake cover;

whereby, the brake cover may keep away a rear wheel of the skateboard cart by way of said two springs urging against the lower end of the brake cover in case of the brake cover in a state of not pressed by a foot.

2. The brake device in a skateboard cart as defined in claim 1, the wherein said lower end of the brake cover is provided with a fitting hole to align with engaging hole in the projection ear to constitute a fulcrum.

* * * * *